United States Patent [19]

Davis

[11] 4,183,772

[45] Jan. 15, 1980

[54] COMPOSITION AND METHOD FOR COATING METAL SURFACES

[75] Inventor: James W. Davis, North Wales, Pa.

[73] Assignee: Union Carbide Corporation, New York, N.Y.

[21] Appl. No.: 873,251

[22] Filed: Jan. 30, 1978

[51] Int. Cl.² ...................... C23F 11/04; C09K 15/32; B05D 1/38; B05D 7/14
[52] U.S. Cl. .................................. 148/6.16; 148/31.5; 260/29.6 M; 260/29.6 MP; 260/29.6 WB
[58] Field of Search ............................. 148/6.16, 31.5; 260/29.6 WB, 29.6 M, 29.6 MP

[56] References Cited

U.S. PATENT DOCUMENTS

| | | | |
|---|---|---|---|
| 3,063,877 | 11/1962 | Schiffman | 148/6.16 |
| 3,185,596 | 5/1965 | Schiffman | 148/6.16 |

*Primary Examiner*—James R. Hoffman
*Attorney, Agent, or Firm*—John S. Piscitello

[57] ABSTRACT

This application is concerned with the treatment of metal surfaces with stable solutions of hexavalent chromium, trivalent chromium, phosphoric acid, polyacrylic acid and water dispersible acrylic emulsion polymer to enhance the corrosion resistance and paint adhesion properties of the metal; the coating uniquely having generally universal utility under a wide variety of paint systems and paint types.

13 Claims, No Drawings

COMPOSITION AND METHOD FOR COATING METAL SURFACES

This invention relates to the art of treating metal surfaces—especially iron, zinc and aluminum surfaces—to improve their corrosion resistance and to prepare them to receive a siccative finish.

Many different types of treatments have been proposed for these purposes such, for example, as those in which a chemical conversion coating is applied by treating the metal with aqueous acid phosphate or acid chromate solutions. Other procedures embody the addition of resinous vehicles to aqueous chromic acid treating solutions. However, regardless of the particular system employed, the ultimate objective of such practices is essentially the same, namely, to secure maximum corrosion protection of the metal substrate while simultaneously achieving high levels of impact resistance, flexibility and paint bonding qualities. Naturally, the securing of such a desirable combination of properties is often difficult to achieve, as witness the many proposals which are familiar to the art.

Another highly desirable attribute of any such metal treating method is the ability to be able to employ a system wherein the coating is formed on contact with the metal surface followed by drying—usually hot air drying or oven baking and without the need of rinsing or squeegeeing the surface to remove excess liquor. Such treatments are usually referred to as "no waste" pretreatments and have obvious ecological benefits due to the fact that effluents—toxic or otherwise—are not involved in the treatment.

One of the principal defects of presently available "no waste" pretreatments is their lack of "universality" with respect to the paint systems that can be applied to the treated metal surface. The treating solution must be especially tailored to meet the needs of the particular paint system under which it will be used. No single "no waste" metal treating formulation is known that will give optimum performance under a wide variety of different paint systems. Thus "no waste" coating treatments that are intended to give optimum performance under a solvent-type paint system may not give comparable results under water-base type paint systems, and vice versa. Moreover, even as between different types of solvent paint systems, such as polyester, vinyl, alkyd, plastisol, organosol, etc., for optimum performance the solution used for metal pretreatment may require adaptation specifically to the particular paint it is to be used under.

Heretofore, one of the most satisfactory of the "no waste" pretreatments involves the use of metal treating solution and method disclosed in Louis Schiffman's U.S. Pat. No. 3,185,596. Although it exhibits excellent performance when used under vinyl paints, it simply was not found to be effective under polyester paint systems.

The principal object of the present invention is to provide an improved method as well as improved solutions for applying resinous, protective, flexible and impact-resistant paint bonding coatings on the surfaces of ferriferous, zinciferous and aluminiferous surfaces and that exhibit unusually high performance levels when used with many different types of paints and paint systems.

It is also an object of this invention to provide stable coating solutions for the purposes described.

Another object is to produce articles having a final siccative finish which are greatly improved as to appearance, corrosion resistance and longevity.

The Schiffman U.S. Pat. No. 3,185,596 patent is concerned with treating solutions that contain "mixed chromium compounds" and water soluble or water dispersible polyacrylic acid. The so-called "mixed chromium compounds" are mixtures of hexavalent chromium and trivalent chromium that are prepared by partially reducing aqueous acid solutions of hexavalent chromium. Such reduction can be effected by any of many known techniques—preferably through the use of reducing agents that do not form objectionable reaction products that are retained in the treating solution. According to Schiffman's U.S. Pat. No. 3,185,596 he prefers to effect the partial reduction by the use of formaldehyde as more fully described in another of his patents (U.S. Pat. No. 3,063,877) and to effect from at least 20 to about 60% reduction of the hexavalent chromium. The earlier '877 patent points out that solutions containing the partially reduced chromium values can be utilized to improve the corrosion resistance not only of a previously applied coating but also that of the surface of a base metal substrate itself. In the later '596 patent, patentee discloses that if there be added to an aqueous solution containing at least 0.25% by weight of the aforementioned mixed chromium compounds, at least 0.25% by weight of a polyacrylic acid-compound an admixture will be produced which, when applied to metal substrates, will yield a coating which has greatly improved corrosion and impact resistance, flexibility and paint-bonding ability.

In the formulation of the '596 patent the polyacrylic acid compound could be either of the water soluble or of the water dispersible type and specifically the water soluble types that are readily available as standard articles of commerce, including those that are known under the proprietary name Acrysol; for example, the aqueous solutions of polyacrylic acids having different molecular weights and viscosities are designated as Acrysol A-1 and Acrysol A-3. Patentee also discloses that a water dispersible emulsion of polyacrylic acid known as Rhoplex AC-200 is commercially available and can be used in the system. Acrysol and Rhoplex are trademarks registered in the name of Rohm & Haas Company.

The present invention represents a modification and extension of the teaching of the '596 patent in that it has now been found that coating formulations can be made that impart outstanding corrosion resistance to metal surfaces such as iron, aluminum and zinc and at the same time are generally universally useful under almost all types of paints and paint systems; this improvement by blending hexavalent chromium, trivalent chromium, phosphoric acid, soluble polyacrylic acid and water dispersible acrylic emulsion polymer in specific ratios.

For purposes of this invention in order to achieve optimum performance and widest universality under paint, the partial reduction of the hexavalent chromium is preferably controlled so that from about 46–50% of the hexavalent chromium is reduced to the trivalent state; it is possible to achieve some of the benefits of the invention if from 40 to 60% of the hexavalent chromium is reduced to the hexavalent state but only at a sacrifice of stability of the solution and paint adhesion properties. Thus as the degree of reduction of the hexavalent chromium increases above about the 50% range level, the treating solution will become increasingly unstable. Conversely, as the degree of reduction falls below about 46% the paint adhesion properties tend to deteriorate. The preferred formulation in accordance with the invention involves a concentrate containing about 10 parts by weight of the mixed chromium compounds (calculated as $CrO_3$) in about 200 parts by weight of solution—which in use can be further diluted as will be described hereinafter.

Unlike in the '596 patent, phosphoric acid is an essential ingredient rather than an optionally employed material to adjust pH. It has a decided influence on both the corrosion resistance and the paint adhesion properties. The phosphoric acid desirably should be present at about 3 to 4 parts by weight of the phosphoric acid (100% $H_3PO_4$) to above 10 parts of the mixed chromium compounds. As the concentration of phosphoric acid is increased above the 4/10 ratio, the paint adhesion properties—particularly under vinyl paints—become poorer but concurrently the adhesion properties under polyester paints is enhanced. Conversely, a decrease in the 4/10 ratio gives poor paint adhesion under polyester paints but somewhat better adhesion under vinyl paints. Thus, the preferred 3–4 parts $H_3PO_4$ to 10 parts mixed chromium compounds represents a compromise that enables the treating solution to be effectively used under both vinyl and polyester paints.

In accordance with the present invention the treating solution should contain a much lower concentration of the water soluble polyacrylic acid component than was used in the '596 Schiffman formulation—to wit, about 4 to 5 parts by weight polyacrylic acid solids to 10 parts of mixed chromium compounds in order to obtain optimum performance and universality of use under paint. For this purpose it is preferred to use Acrysol A-1 (an aqueous solution containing 25% by weight polyacrylic acid solids).

The formulation of the invention also includes a rather large concentration of acrylic emulsion polymer solids, namely about 17 to 20 parts by weight of such emulsion polymer solids to 10 parts by weight of the mixed chromium compounds. The stability of the formulation has a tendency to decrease as the upper limit is raised and the paint adhesion properties—particularly under vinyl paint—tends to decrease and the universality benefits are diminished.

An acrylic emulsion polymer useful in accordance with the invention is a commercially available product known as Rhoplex AC-73, an emulsion with a non-ionic surfactant containing about 46.0–47.0% polymer solids of a pH of 9.0 to 10.0 and that is intended for use in neutral to alkaline applications for forming hard films. Unlike Rhoplex AC-200, it does not contain any thermosetting components. It is an unusual aspect of this invention that the strongly acidic formulations thereof can include the alkaline acrylic emulsion polymer and still exhibit stability. The mechanism whereby this result is obtained is not known with certainty. Nevertheless, I have found it possible to make highly stable formulations by insuring that, before the water dispersible polymer is added to the other components, care must be taken to insure that the water soluble polyacrylic acid has completed interacted with the chromium and/or phosphoric acid, and that suspended undissolved particles of reactants are not present in the chromium polyacrylic acid solution. One way of achieving this objective is to permit the partially reduced chromium-polyacrylic acid mixture to set or age for periods of 20 or more hours. The careful introduction of the emulsion to the solution under conditions that minimize "shock" are also beneficial in attaining this objective.

Generally speaking, the reduction of the hexavalent chromium and the mixing of the polyacrylic acid are accomplished by the same techniques discussed in the Schiffman '596 patent but greater care must be exercised to avoid boilover during reduction that will cause crusts of dried chromium salts to form on the surfaces of the reaction vessel and which redissolve in the chromium-resin solution only with difficulty. Hence, during reduction the mass should be maintained under conditions that minimize boilover. Similarly during the addition of the polyacrylic acid it is important to form a complete solution of all solids present and therefore it is preferred to allow the polyacrylic acid-chromium solution to "cure" or "age" for a sufficient time to insure that the reaction between the polyacrylic acid and the chromium is complete and all solids are in solution before the acrylic emulsion polymer is added.

In preparing the treating formulation in accordance with this invention it is preferred to use either deionized or distilled water in order to minimize the amount of salts that would be deposited in the coating and provide points of corrosion.

For unpainted corrosion resistance additional conventional precleaning operations to remove dirt, grease, and any oxide films are necessary for optimum performance.

The treating solutions can be applied in the manner described in the Schiffman '596 patent or any of the usual application techniques known to the art such as roll coating, reverse roll coating, dip, flow coating, spray or mist applications. The application of the compositions of this invention require no rinse and produce no waste. Depending on the method of application everything applied to the metal surface remains except the water that evaporates in drying; or, excess amounts applied can be removed by drip, spin or the like and reused. We desire, however, to deposit on the metal a coating weight of from 5 to 100 $mg/ft^2$, depending on the metal substrate involved. In underpaint application to aluminum and iron, optimum results are obtained with from 5 to 50 $mg/ft^2$ of coating weight and preferably about 20 $mg/ft^2$. With zinc surfaces such as galvanized iron (underpaint) best results are obtained with coating weights of 5–50 $mg/ft^2$, and preferably from 10–15 $mg/ft^2$ coating weight. Where unpainted corrosion resistance is desired for example on aluminum, the effect is desirably obtained with coating weights of 5–100 $mg/ft^2$ and preferably with 80–100 $mg/ft^2$ coating weight. To achieve these coating weights and depending on the coating weight desired, the concentrated solution of Example 1 can be applied as such or as a diluted bath containing about 0.8% or more solids on a volume/volume basis. Preferably the composition of this invention is employed by preparing the concentrate according to Example 1 and applying it as a 20% dilution in deionized water prepared by adding four parts of deionized water to one part of the concentrate (volume/volume). When used in this manner, the desired coating thickness is developed faster with less volume and faster dry off than the known chrome and polyacrylic acid coatings. Moreover, the coatings in accordance with this invention produce a more uniform surface which is particularly important for spangled galvanized metal with varied surfaces. The present compositions exhibit better film forming characteristics than known polyacrylic acid chrome compositions.

EXAMPLE 1

This example will describe the preferred method of making a concentrate which can be used as such or further diluted before being used to treat metal:

41.5 grams of chromium trioxide were dissolved in about 250-300 ml deionized water together with 14.5 grams phosphoric acid (100% $H_3PO_4$). The solution was agitated and heated to about 130° F. and 4.4 grams formaldehyde (100% HCH0) was slowly added. While stirring about one hour, the solution was maintained at a temperature between about 185°-195° F. Upon completion of the formaldehyde addition, heating was continued for 2 hours and the solution temperature maintained at or near boiling. About 300-350 ml. of deionized water was added to the solution and then 76 grams Acrysol A-1 solution (25% solids polyacrylic acid, weight/volume) were introduced with stirring. The resulting solution was diluted with deionized water to a volume of about 800 ml., thoroughly mixed and allowed to set for 72 hours. In a separate container 160 grams Rhoplex AC-73 emulsion (46-47% solids weight/volume) was prepared as a 75% volume/volume "solution" in deionized water by adding sufficient water to make 200 ml. total. The diluted acrylic emulsion was slowly added to the aged reduced chrome-acrylic acid solution with stirring. This gave a concentrate which can be used in its concentrated form to form corrosion resistant coatings where a paint is not going to be applied thereto or it can be further diluted to as much as 20 liter volume with deionized water for use in underpaint application.

EXAMPLE 2

This example illustrates the improved adhesion and corrosion resistance provided by the coating compositions of this invention under various paint systems and also shows the universality of the coatings of this invention; i.e., their usefulness under different paint systems.

Test panels are prepared by using treating solutions of the present invention prepared in accordance with Example 1 at 20% dilution and for comparison panels were also treated with a formula in accordance with the Schiffman '596 Patent but not containing acrylic emulsion polymer (hereinafter designated as Formula A).

Using a laboratory spin technique, coatings were applied to clean aluminum panels (0.024 inch thickness) at room temperature to a coating weight of about 20 mg/ft² in each case. After application of the coating, each panel was dried with hot air using a heat gun. The metal temperature during the drying reaches about 110° F. to 120° F. After cooling, the panels were painted with standard coil coating paints in accordance with the manufactuer's specification using three different paint systems.

(a) standard single coat polyester system
(b) vinly paint system
(c) a two coat Plastisol paint system using two different primer cure temperatures.

The cured painted panels were then subjected to standard tests to determine paint adhesion and corrosion resistance as follows:

(1) ambient taped reverse impact adhesion tested using ⅝" ball at 48 inch-lbs.
(2) cold taped reverse impact adhesion tested as above with the panel at −10° F. at the time of impact (3) Cleveland Condensing Humidity Test (ASTM D 714 Rating)
(4) MEK solvent resistance test in which the number of double wipes with a cheese cloth soaked with methyl ethyl ketone that is required to remove paint from the metal surface is determined.
(5) Pencil Hardness Test The results are shown in Table I below.

Table I

| Paint System | Test | Formulation A | Formulation of Example 1 |
| --- | --- | --- | --- |
| Polyester | Ambient impact | no paint loss | no paint |
|  | Cold impact | 30% paint loss | no paint loss |
|  | Cleveland Humidity | No. 8 blisters at 72 hours | no blisters at 240 hours |
|  | MEK | 57 double rubs | 100 plus double rubs |
|  | Pencil Hardness | HB | HB |
| Vinyl | Ambient impact | no paint loss | no paint loss |
|  | Cold impact | 5% paint loss | no paint loss |
|  | Cleveland Humidity | #8 few blisters at 240 hours | no blisters at 240 hours |
|  | Pencil Hardness | HB | H to 2H |
|  | Wet impact* | 5% paint loss | no paint loss |
| Primer cured at 380° to 390° F. plus Plastisol topcoat | Ambient impact | 30% paint loss | no paint loss |
| Primer cured at 435° F. plus Plastisol topcoat | Ambient impact | no paint loss | no paint loss |
| Two coat water based paint | Wet impact* | — | no paint loss |

*Same as ambient impact test with the panel soaked in deionized water for two hours at room temperature and impacted immediately upon removal.

The results demonstrate that with respect to a standard single coat polyester system, both the present invention and a formulation prepared from the '596 patent, but not containing an acrylic emulsion polymer, exhibited no paint loss with the taped ambient reverse impact test; however, 30% paint loss was observed with formulation A with the cold reverse impact test compared to no paint loss observed with the formulation of the present invention. Further, formulation A exhibited #8 blisters after 72 hour exposure to Cleveland Condensing Humidity; whereas the formulation of the present invention did not exhibit any blistering after 240 hours. In addition, the solvent resistance was unsatisfactory with formulation A (57 double rubs in comparison to 100 plus for the present invention). With respect to the two-coat plastisol paint system, formulation A required an increase in the cure temperature of the primer paint and the present invention did not in order to achieve satisfactory quality with respect to the taped ambient reverse impact adhesion. With respect to a vinyl paint system, formulation A exhibited a pencil hardness of HB rather than the required H to 2H, whereas the present invention exhibited the required hardness.

EXAMPLE 3

This example illustrates the effect of varying proportions of ingredients upon performance under different paint systems. The tests were carried out as in Example 2 above utilizing formulations of this invention (prepared according to Example 1) varied as follows:

Formulation (i)

Prepared from 100 cc of the concentrate of Example 1 to which is added 400 cc of solution containing 50 grams chromium trioxide per liter in deionized water to give a total of 44.3 grams per liter of hexavalent chrome expressed as $CrO_3$ and 2.1 grams per liter of trivalent chrome expressed as chromium, in the test solution.

Formulation (ii)

The composition of Example 1 at 20% dilution in which the phosphoric acid concentration is increased from 2.9 g/l to 17.9 g/l.

Formulation (iii)

The composition of Example 1 at 20% dilution in which the concentration of polyacrylic acid is increased from 3.8 g/l to 18.8 g/l.

Formulation (iv)

The composition of Example 1 with increased concentration of reduced chrome prepared by adding to 100 cc of the concentrate of Example 1 an additional 400 cc of solution containing 18.0 g/l of chromium trioxide at about 47% reduction by the method of Example 1 such that the total combined solution contains 12.1 g/l of hexavalent chrome expressed as $CrO_3$ and 5.5 g/l of trivalent chrome expressed as chromium.

The results are shown in Tables II and III below.

Table II

| Paint System | Test | Formulation (i) | (ii) | (iii) | (iv) |
|---|---|---|---|---|---|
| Polyester | Cold impact | 100% paint loss | no paint loss | no paint loss | 1 to 2% paint loss |
| Vinyl | Cold impact | 80% paint loss | 100% paint loss | 90% paint loss | no paint loss |
|  | Ambient impact | 5%–10% paint loss | 30% paint loss | 30% paint loss | no paint loss |

Table III

| Paint System | Test | Formulation (i) | (ii) | (iii) | (iv) |
|---|---|---|---|---|---|
| Polyester | Cleveland Humidity (120 hrs.) | No. 4 blisters dense | No. 8 blisters medium dense | No. 2 blisters dense | No blisters |
| Vinyl | Cleveland Humidity (120 hrs.) | No. 8 blisters dense | No. 8 blister few | No. 8 blisters dense | No blisters |

The results in Tables II and III illustrate the criticality in the relative proportions of ingredients in order to provide universality with high performance in both adhesion of corrosion resistance.

Corrosion resistance under both polyester and vinyl paint systems measured by the Cleveland humidity test indicates that the ratio of hexavalent to trivalent chrome is more significant than total chrome concentration as shown by the result in Table III. Corrosion resistance also decreases with increases in phosphoric acid or polyacrylic acid concentration.

I claim:

1. The method of making a stable aqueous composition for coating metal surfaces to enhance the corrosion resistance and paint adhesion properties thereof, said composition containing, as the coating forming ingredients: hexavalent chromium, trivalent chromium, phosphoric acid, polyacrylic acid, and an acrylic emulsion polymer, and said method comprising:

(1) forming an aqueous solution of the chromium trioxide and the phosphoric acid;

(2) reducing about 40 to 60% of the hexavalent chromium to trivalent chromium under conditions adapted to completely dissolve all of the reaction products;

(3) adding the polyacrylic acid to the partially reduced chromium solution under conditions adapted to insure complete interaction of the reactants present; and (4) adding the acrylic emulsion polymer to the partially reduced chromium polyacrylic acid solution.

2. The method according to claim 1 wherein from about 46 to 50% of the hexavalent chromium is reduced by means of a reducing agent that will not form objectionable reaction products in the solution.

3. The method according to claim 2 where the reducing agent is formaldehyde.

4. The method of making a stable aqueous composition for coating metal surfaces to enhance the corrosion resistance and paint adhesion properties thereof and which comprises:

(a) dissolving about 41.5 grams chromium trioxide and about 14.5 grams phosphoric acid (100% $H_3PO_4$) in about 250 to 300 ml water;

(b) adding about 4.4 grams formaldehyde (100% HCHO) under conditions adapted to prevent boil-over;

(c) maintaining the reactants at about 180°–190° F. for sufficient time to effect completion of the partial reduction of the chromium, to eliminate any unreacted formaldehyde and to insure the complete dissolution of the resulting reaction products;

(d) diluting the resulting solution with about 300–350 ml water;

(e) adding thereto about 76 grams of a polyacrylic acid solution (25% solids weight/volume) in a manner adapted to complete the reaction between the phosphoric acid and chromium values and the polyacrylic acid;

(f) bringing the total solution volume to about 800 ml with added water; and (g) thereafter, adding 160 grams of acrylic emulsion polymer dispersion (containing about 46–47% solids weight/volume) diluted to 200 ml with water, to the partially reduced chromium-polyacrylic acid solution.

5. As a composition of matter the stable solution produced by claim 1.

6. A stable aqueous solution for coating metal surfaces to enhance their corrosion resistance and paint adhesion properties, said solution containing:

(a) about 10 parts by weight of chromium trioxide, about 40–55% of which has been reduced to the trivalent state;

(b) about 3 to 4 parts by weight of phosphoric acid (100% $H_3PO_4$);

(c) about 4 to 5 parts by weight of polyacrylic acid;

(d) about 17 to 20 parts by weight of acrylic emulsion polymer solids: and (e) water to make from about 200 to 4000 parts by weight of solution.

7. A stable aqueous solution for coating metal surfaces to enhance their corrosion resistance and paint adhesion properties, said solution having a pH between about 1 and 2 and containing:

(a) about 8.3 grams of chromium trioxide, about 46–50% of which has been reduced to the trivalent state;
(b) about 2.9 grams of phosphoric acid (100% $H_3PO_4$);
(c) about 3.8 grams of polyacrylic acid;
(d) about 14.9 grams of acrylic emulsion polymer solids; and
(e) water to make from about 200 ml to 4 liters of solution.

8. The method of improving the corrosion resistance of a metal surface which comprises contacting the metal surface with the aqueous solutions according to any of claims 5 through 7 and drying and heat curing the thus formed coating.

9. The method of improving the corrosion resistance and paint adhesion properties of a metal surface according to claim 8 wherein the coated metal surface is iron, aluminum or zinc.

10. A metal product having a surface treated by the method of claim 8.

11. The method of applying protective coatings to metal surfaces which comprises contacting the metal surface with the aqueous solution according to any of claims 5 through 7, drying the thus treated surface to remove the adhering carrier water, and applying a coating of paint to the thus treated surface.

12. The method of applying protective coatings to metal surfaces according to claim 11 wherein the paint is a solvent type paint system.

13. The method of applying protective coatings to metal surfaces according to claim 11 wherein the paint is a water base paint system.

* * * * *

UNITED STATES PATENT AND TRADEMARK OFFICE
CERTIFICATE OF CORRECTION

PATENT NO. : 4,183,772
DATED : January 15, 1980
INVENTOR(S) : James W. Davis

It is certified that error appears in the above-identified patent and that said Letters Patent are hereby corrected as shown below:

On the cover page of the patent, in the lines identified by "[73] Assignee:", for "Union Carbide Corporation, New York, N.Y." read --Amchem Products, Inc., Ambler, Pa.--.

Column 2, line 28, "acid-compound" should read --acid compound--.
Column 3, line 62, "completed" should read --completely--.
Column 5, line 55, "manufactuer's" should read --manufacturer's--
Column 5, line 58, "vinly" should read --vinyl--.

Signed and Sealed this

Twenty-second Day of July 1980

[SEAL]

Attest:

SIDNEY A. DIAMOND

*Attesting Officer*  *Commissioner of Patents and Trademarks*